United States Patent [19]

Belanger

[11] Patent Number: 5,148,500
[45] Date of Patent: Sep. 15, 1992

[54] MORPHOLOGICAL PROCESSING SYSTEM
[75] Inventor: Richard P. Belanger, Carlisle, Mass.
[73] Assignee: AOI Systems, Inc., Lowell, Mass.
[21] Appl. No.: 645,194
[22] Filed: Jan. 24, 1991
[51] Int. Cl.[5] ............................................. G06K 9/44
[52] U.S. Cl. ...................................... 382/55; 382/49; 382/54
[58] Field of Search ............................. 382/55, 54, 49

[56] References Cited

U.S. PATENT DOCUMENTS

| | | | |
|---|---|---|---|
| 4,204,232 | 5/1980 | Mizuno | 358/260 |
| 4,368,462 | 1/1983 | Crawley | 340/146.3 |
| 4,665,441 | 5/1987 | Sakaue et al. | 382/55 |
| 4,694,342 | 9/1987 | Klees | 358/167 |
| 4,777,651 | 10/1988 | McCann et al. | 382/56 |
| 4,809,348 | 2/1989 | Meyer et al. | 382/49 |
| 4,845,569 | 7/1989 | Kurahayashi et al. | 358/400 |
| 4,850,027 | 7/1989 | Kimmel | 382/49 |
| 4,853,967 | 8/1989 | Mandeville | 382/49 |
| 4,949,390 | 8/1990 | Iverson et al. | 382/49 |

OTHER PUBLICATIONS

Zhang and Suen, "A Fast Parallel Algorithm for Thinning Digital Patterns", Communications of the ACM, Mar. 1984, vol. 27 No. 3, pp. 236-239.
Mandeville, "Novel Method for Analysis of Printed Circuit Images", IBM J. Res. Develop. vol. 29, No. 1, Jan. 1985, pp. 73-86.
Lu and Wang, "A comment on A Fast Parallel Algorithm for Thinning Digital Patterns", Communications of the ACM, Mar. 1986, vol. 29, No. 3, pp. 239-242.
Holt et al., "An Improved Parallel thinning Algorithm", Communications of the ACM, Feb. 1987, vol. 30, No. 2, pp. 156-160.
Guo and Hall, "Parallel Thinning with Two-Subiteration Algorithms", Communications of the ACM, Mar. 1989, vol. 32, No. 3, pp. 359-373.

Primary Examiner—Leo H. Boudreau
Assistant Examiner—Steven P. Klocinski
Attorney, Agent, or Firm—David G. Conlin; Robert M. Asher

[57] ABSTRACT

Image processing elements forming an image processor for automatic inspection of circuits. Each processing element for performing a thinning algorithm passes along a data bit and a flag bit to each succeeding processing element. The flag bits permit a conditional deletion of a data bit. Within each processing element a feedback bit is used to indicate when a previous bit has been deleted. The skeletonized image is reviewed for identification of circuit geometries and counting the number of separate blobs. A report is generated in response to the identified geometry and blob count.

10 Claims, 4 Drawing Sheets

FIG.3A

FIG.3B
OUTPUT: FLAG=0
DATA=0

FIG.3C
OUTPUT: FLAG=1
DATA=0

FIG.4A

FIG.4B
OUTPUT: FLAG=0
DATA=0

FIG.4C
OUTPUT: FLAG=0
DATA=0

FIG.4D
OUTPUT: FLAG=0
DATA=0

FIG.4E
OUTPUT: FLAG=1
DATA=1

FIG.5A

FIG.5B
OUTPUT: FLAG=0
DATA=0
FEEDBACK=1

IF FEEDBACK=0
FIG.5C
OUTPUT: FLAG=0
DATA=0
FEEDBACK=1

IF FEEDBACK=1
FIG.5D
OUTPUT: FLAG=0
DATA=1
FEEDBACK=0

FIG.7A
ZERO-JOIN
PE18=1 (ZERO-JOIN)
PE20=0 (NO BLOBS)

FIG.7B
ONE-JOIN
PE18=2 (ONE-JOIN)
PE20=0 (NO BLOBS)

THREE - JOIN
PE18 = 4 (THREE-JOIN)
PE20 = 0 (NO BLOBS)

FIG. 7C

FOUR - JOIN
PE18 = 5 (FOUR-JOIN)
PE20 = 0 (NO BLOBS)

FIG. 7D

BLOB-JOIN
PE18 = 3 (SKELETAL)
PE20 = 1 (ONE BLOB)

FIG. 7E

BLOB / 2 TRACES
PE18 = 4 (THREE-JOIN)
PE20 = 1 (ONE BLOB)

FIG. 7F

BLOB / 3-TRACES
PE18 = 5 (FOUR-JOIN)
PE20 = 1 (ONE BLOB)

FIG. 7G

2-BLOBS (WITH SKELETAL PIXEL)
PE18 = 3 (SKELETAL)
PE20 = 2 (TWO BLOBS)

FIG. 7H

2-ADJACENT BLOBS
PE18 = 6 (ON BOUNDARY)
PE20 = 2 (TWO BLOBS)

FIG. 7I

2-BLOBS / 1-TRACE
PE18 = 4 (THREE-JOIN)
PE20 = 2 (TWO BLOBS)

FIG. 7J

2-BLOBS / 2-TRACES
PE18 = 5 (FOUR-JOIN)
PE20 = 2 (TWO BLOBS)

FIG. 7K

3-BLOBS
PE18 = 4 (THREE-JOIN)
PE20 = 3 (THREE BLOBS)

FIG. 7L

3-BLOBS / 1-TRACE
PE18 = 5 (FOUR-JOIN)
PE20 = 3 (THREE-BLOBS)

FIG. 7M

4-BLOBS
PE18 = 5 (FOUR-JOIN)
PE20 = 4 (FOUR BLOBS)

FIG. 7N

MORPHOLOGICAL PROCESSING SYSTEM

BACKGROUND OF THE INVENTION

The present system is directed to a morphological processing system for skeletonizing a binary image and detecting distinctive features therein. In particular, the system is designed for use in detecting defects in circuit patterns.

Various efforts have been made to develop algorithms for thinning or skeletonizing binary images. One such prior effort is disclosed in an article entitled "A Fast Parellel Algorithm for Thinning Digital Patterns" which was published in *Communications of the ACM*, Vol. 27, No. 3, March, 1984 by the authors T. Y. Zhang and C. Y. Suen. The Zhang and Suen algorithm analyzes the images in 3×3 matrices. The algorithm requires two iterations, one aimed at deleting the southeast boundary points and the northwest corner points while the other is aimed at deleting the northwest boundary points and the southeast corner points. Another such effort at thinning is disclosed in U.S. Pat. No. 4,949,390 (Iverson et al.). Iverson et al. discloses a single pass thinning and trimming algorithm which reviews 4×5 pixel neighborhood images.

Automatic optical inspection systems have been developed which make use of thinning algorithms to simplify the task of feature detection in a printed circuit image. For example, U.S. Pat. No. 4,853,967 (Mandeville) discloses a system which seeks to detect such features as T-joints, blob-joints and terminal ends. Mandeville intersperses the use of thinning and comparing identified features with a design list.

It is an object of the present invention to provide an improved single pass thinning algorithm and apparatus for use in feature detection. It is thus a further object to provide an improved feature detection and reporting system.

SUMMARY OF THE INVENTION

The present invention is directed to a flag and feedback algorithm for achieving thinning of a binary image. The invention is further directed to using the thinned image for feature detection.

The image processing elements of the present invention receive a serial stream of data bits and input them through parallel arrays of registers. In the preferred embodiment, three parallel arrays of three registers are used. Line buffers are associated with the registers such that the three parallel arrays of registers hold a window from the image being processed. Each processing element includes a lookup table for generating an output including a data bit and a feedback bit in response to the data bits contained in the parallel arrays of registers and the feedback bit generated in the previous cycle. An additional, output from each processing element is a flag bit which is used to conditionally delete a data bit. A data bit and a flag bit from each processing element is received by a logic unit in a subsequent processing element whereby any correction to the data bit due to the conditional deletion of the bit as evidenced by the flag bit takes place. The processing elements produce a thinned image which is reviewed by feature detection processing elements. The number of blobs in a window are counted. The circuit geometries in a window are identified. A report is generated in response to the number of blobs and the circuit geometries identified.

Other objects and advantages of the invention will become apparent during the following description of the presently preferred embodiment of the invention taken in conjunction with the drawings.

BRIEF DESCRIPTION OF THE DRAWINGS

FIG. 3A is an illustration of the data bits for a portion of an image to be processed.

FIGS. 3B and 3C illustrate 3×3 windows found in the image of FIG. 3A and provide the outputs from a thinning PE of the present invention.

FIG. 4A is an illustration of the data bits for a portion of an image to be processed.

FIGS. 4B, 4C, 4D and 4E are illustrations of 3×3 windows found in the image of FIG. 4A and provide the outputs from a thinning PE of the present invention.

FIG. 5A is an illustration of the data bits for a portion of an image to be processed.

FIGS. 5B, 5C and 5D are illustrations of 3×3 windows and their outputs as determined by a thinning PE of the present invention.

FIGS. 6A and 6B are illustrations of 3×3 windows in which the center pixel is considered definitely redundant by the presently preferred embodiment of the invention.

FIGS. 7A-N are illustrations of skeletonized image portions along with the report generated by the inputs from a join detection PE and a blob counter.

DETAILED DESCRIPTION OF THE PREFERRED EMBODIMENT

Figure 1:
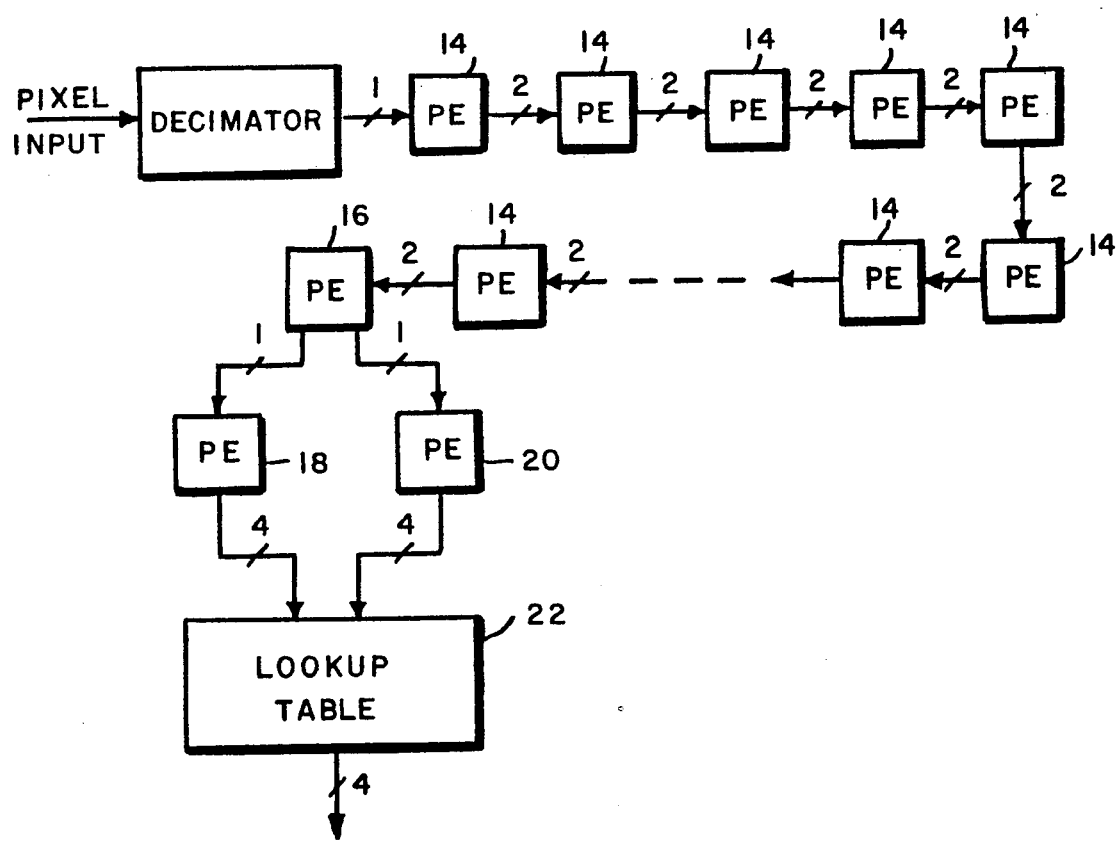
FIG. 1 is a schematic diagram of the morphological processing system of the present invention.

Optical image capturing equipment for converting an image into a pixel array does not form a part of the present invention. Such equipment is well known in the art. The preferred embodiment employs a series of CCD cameras under which printed circuit boards are passed. Each pixel will be represented by a 1 or 0 to represent either conductor or insulator. Of course, the present invention could be used with other applications in which a printed page is being scanned and the 1's or 0's can be used to represent the print or page background. In accordance with the preferred embodiment, conductors are represented by 1's and insulators are represented by 0's. The live pixel information may be fed into the morphological processing system or alternatively, a matrix forming memory may be inserted between the live pixel information and the morphological processor. An example of a matrix forming memory for this function is disclosed in U.S. Pat. No. 4,578,810 (MacFarlane).

The pixel data, whether live from the CCD's or from a matrix forming memory, are delivered serially to the morphological processor. The pixels are provided one bit in each clock cycle moving one at a time up each line. Each line follows the other in consecutive order so as to complete the two dimensional array of the binary image.

At the input end of the morphological processor, a decimator 12 may be provided. The decimator 12 may reduce the apparent size of the features of the image by a fixed amount. The decimator may be programmed to reduce the image by a factor of eight, four, two or none. If there is no reduction, the image passes through the decimator unchanged. A reduction by two takes the incoming pixel information and halves it in both dimensions. So, for a reduction rate of two, a window of size 2×2 in the original image is replaced by one new pixel. For a reduction by a rate of eight, the original data will be eight times less in both dimensions. In this case, only one pixel results from each imaginary 8×8 window of pixels.

There are several ways to accomplish decimation. One method is to choose one pixel within the window and output that value as the value of the window. In this way, the resultant image is a sampling of the original data at the chosen decimation rate. Another decimation method is either to favor conductor or favor insulator. If any pixel in the window is conductor and conductor is being favored, then a 1 representing conductor is output for that window. The opposite method is employed if insulator is being favored, such that if any pixel in a window is an insulator, then a 0 for representing insulator would be output for that window. If the system is designed for detecting shorts, it may be preferable to favor conductor so that the sampling does not make the system miss important shorts formed by conductors of less size than the rate of decimation. If the system is designed for detecting deficient line widths, it may be desirable to favor insulator in which case an area with a deficient line width may be processed as a break.

The decimator provides the image serially one pixel at a time into a series of processing elements (PE) 14. The processing elements 14 are programmable for performing thinning in a single pass. Each PE 14 decides whether or not in its turn to remove a conductor pixel. The objective is to thin the conductor image down to its skeleton while retaining all of its features. A PE 14 can remove a pixel from each side of a conductive line. Thus, in a string of twenty processing elements, the thickness of a conductive line can be reduced by a maximum of forty pixels.

Each PE 14 reviews a window of 3×3 pixels and determines whether or not when the center pixel is a 1, if that 1 can be removed based on the neighboring pixels. Each PE contains a lookup table which is addressed by the nine pixels making up the 3×3 window. The more PE's that are placed in series, the more thinning that can be accomplished. In the presently preferred embodiment, it has been found adequate to provide twenty PE's 14 for thinning.

In order to accomplish single pass thinning, the PE's of the present invention provide a feedback bit from the programmable lookup table which is used with the nine pixel window to address the lookup table and a flag bit which is forwarded with the data bits from one PE to the next. The thinning PE's provide the thinned image in a serial bit stream to a set of processing elements that are programmed for join and blob detection. These include a blob detection PE 16 which feeds a join detection PE 18 and a blob counter 20. A feature lookup table 22 takes the join and blob information to produce a report of the features on the inspected binary image. The report can be compared with a report from a circuit board known to be correct. Discrepancies can be checked by an operator to determine whether a fatal flaw is included within the circuit board being analyzed.

Figure 2:
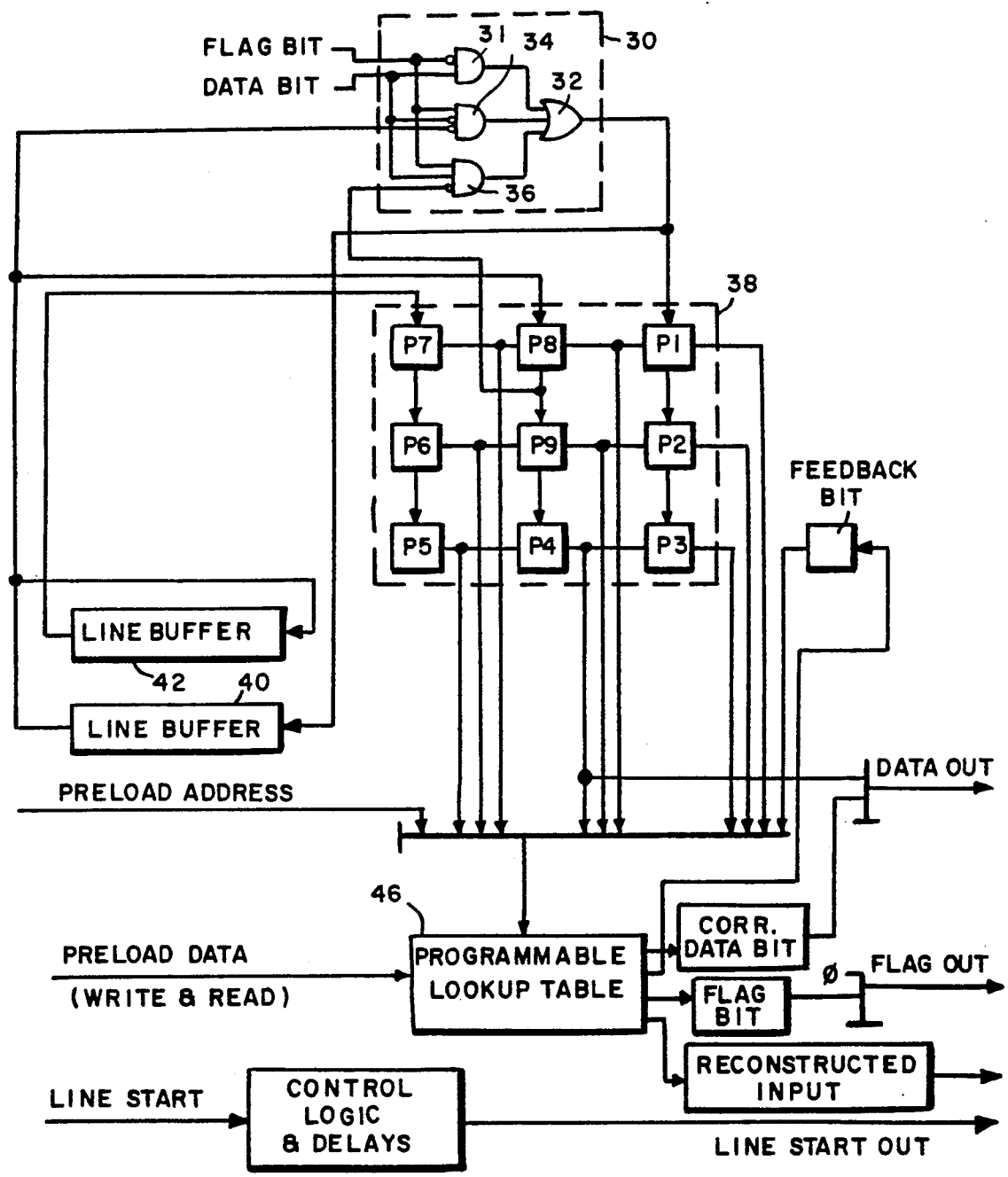
FIG. 2 is a schematic diagram of a processing element for use in the morphological processing system of FIG. 1.

Referring now to FIG. 2, the construction of the PE's will be described in greater detail. When a PE is used for thinning, its function can be described as the removal of conductor pixels from the boundary of conductors by changing these pixels from conductor to insulator. Each PE can remove only those conductor pixels which are adjacent to insulator pixels thereby causing other conductor pixels which had been surrounded by conductor pixels to be candidates for removal by a subsequent PE in the series. In this manner, conductor pixels are removed in successive PE's until either the skeleton of the conductor is generated or the image has passed through the last PE. The number of PE's which should be provided in series depends on the maximum width of a conductor in the image received from the decimator. The thinning algorithm is devised so that a conductor skeleton once thinned to a single pixel in width is not removed by subsequent PE's. The input portion of the PE is correction logic 30. Each processing element has two input lines. One is for data bits and the other for flag bits. For the very first PE in the series, the pixels provided by the decimator are all provided on the data bit line. The flag bit line is not used in the first processing element.

The flag bit is set by a processing element when it wishes to conditionally delete a pixel. Rather than unconditionally delete the pixel, the flag bit is set in case another bit has been deleted by the processing element thereby breaking a connection. To avoid the breaking of a connection, a flag is set and the correction logic 30 is used to restore such a bit when a break in a connection is detected due to the thinning algorithm. When the flag bit is 0, the data bit is passed unchanged through AND gate 31 into a 3×3 array of registers 38 which hold the 3×3 pixel window. If the flag bit has been set for a particular data bit, then if that data bit is a 0 and the pixel to its left as taken from the 3×3 array is a 0, the correction logic 30 will return that data bit to a 1 as shown with respect to AND gate 34 and OR gate 32. Referring now to AND gate 36, if the data bit is a 1 and the pixel below and to the left of the new pixel is a 0 then the data bit will remain a 1 through the OR gate 32. Thus, by setting the flag bit to a 1 and the data bit to a 1, the data bit will be deleted if the pixel below and to the left is a 1.

The flag bit is used to prevent the deleting or breaking of 2-pixel wide vertical lines and of 2×2 pixel blobs. To illustrate, looking at FIG. 3A-C, the 3×3 window moves upward with each conductor pixel in the left column being unconditionally deleted: the output for each of these is FLAG=0, DATA=0. On the next line, each conductor pixel of the right column is conditionally deleted: the output for each of these operations is FLAG=1, DATA=0. The correction logic of the next PE, which has the actual thinned data for the previous line (results for the left column of 1's) can then restore these conditionally deleted pixels, seeing that the left neighbor had been deleted. If the original vertical line was 3 or more pixels wide, then when the correction logic received the FLAG=1, DATA=0 for the right column of 1's, it will not restore the conditionally deleted pixels, seeing that the left neighbor still exists (is still ON). Therefore, 2-pixel wide lines thin to 1-pixel wide, and lines 3 or more pixels wide have a row of pixels on each side removed. For 2×2 blobs, as in FIGS. 4A-E, on the first line of the scan, pixels along the left side of the blob will be unconditionally deleted. On the second line of the scan, the southeast pixel is unconditionally deleted but the northeast pixel is conditionally deleted with FLAG=1, DATA=1. The correction logic of the next PE, which has the actual thinned data from the previous scan line, can then restore the northeast pixel seeing that the southwest pixel was deleted. Therefore, 2×2 blobs are not eradicated.

The data bits from the correction logic are provided first to the upper right hand corner of the 3×3 pixel array of registers 38. The pixels move serially down the right hand column and then into a delay memory line buffer 40. The line buffer delay memory shown in FIG. 2 holds an entire line of pixels from the image being processed, holding a duplicate of the pixels that are in the window array. Of course, it would be equally possible to reconfigure the line buffer so that it receives the entire line, except for the three pixels held in the 3×3 registers 38. Pixels enter the line buffer 40 at one end and exit from the other end into the second column of the 3×3 pixel window. In this manner, the pixels in the 3×3 window array represent a 3×3 window from the image being processed. A line buffer 42 is inserted in between the second and third columns of the three pixel registers in the window array. Thus, as each pixel is added from the correction logic 30 the entire pixel window array shifts up the binary image. At the top of the image, the window splits and then reformulates at the bottom of the image, one pixel over to the right. The split window at the edges is not a problem since the outer edges generally have a sufficient border of insulator and therefore do not contain any critical conductor data which needs to be examined. It is the center pixel marked P9 in the drawing which is being analyzed and subjected to the algorithm of the processing element.

All the PE's are synchronized such that they all run off the same basic clock. There is a "LINESTART" signal which accompanies the data into the first PE. This signal becomes active coincident with the first valid pixel of data into the first PE, and stays active through the last valid pixel of one raster scan line. It thus brackets the valid data. This signal becomes active then inactive for each successive line. Each PE delays this signal an appropriate amount and passes it along to the next PE such that the signal is coincident with valid data coming out of said originating PE. In this manner, the LINESTART signal when active indicates valid data at any point in the series of PE's on through to the output of the join and blob detection PE's. Since the line buffers in each PE are built of static RAM in the preferred embodiment, each PE uses the LINESTART signal to control the beginning of the read/write operations from/to the line buffers. Furthermore, the LINESTART out of any PE is disabled for the first two LINESTARTs into that PE. This insures that at least three valid raster scan lines of data are being examined in the 3×3 window of a PE before that PE signals that it is outputting valid data. Also, by using LINESTART signal to indicate valid data, the number of pixels in a line of data can be varied from several up to the size of the line buffer. In the preferred embodiment, the line buffer for each line can hold up to 32K pixels.

In accordance with the present invention, the thinning algorithm looks at a feedback bit in addition to the values of the nine registers in the 3×3 window array. The feedback bit is set to indicate if a thinning operation has occurred in the previous cycle. Thus, if pixel P4 is a 1 and the feedback bit is also a 1, then the PE 14 knows that P4 has been changed to a 0 in the data bit passed to the next processing element.

The feedback bit is used to prevent breaking or deleting horizontal lines (lines perpendicular to the movement of the window) which are 2 pixels wide. Referring to FIGS. 5A-D, as the 3×3 window moves upward, it will first examine the bottom 1 of a column, and unconditionally delete that pixel and set the feedback bit. The very next pixel to be examined is the 1 above it. Knowing that the neighbor below has just been deleted—via the feedback bit being set—the upper 1 is not deleted. This is because the feedback bit being set causes an alternate entry in the lookup table to be used. If the line was 3 or more pixels wide, there would have been 1 or more intervening 3×3 windows with all pixels ON, the output for the feedback bit for these is 0, and the top 1 will be unconditionally deleted.

A programmable look up table 46 is provided so that whenever the pixel P9 is a conductor on a boundary between conductor and insulator it can be deleted if it is safe to do so without losing a feature of the original image. The programmable look up table 46 is provided with an output for each of the conceivable ten bit addresses provided by the 3×3 window array plus feedback bit. The programmable look up table 46 provides at least three bits of output. These include the flag bit, the corrected data bit and the feedback bit. For diagnostics, a fourth bit may also be provided from the programmable look up table 46. The optional fourth bit is referred to as the reconstructed input bit and is usually the same as the center pixel P9 of the window array. Alternatively, this bit can be programmed to indicate the presence of any particular pattern or set of patterns in the 3×3 window. The reconstructed input bit is passed to image collection logic which allows the capture of an arbitrary rectangle of binary image from any of the PE's. The captured image can be made available for display or analysis such as for lookup table algorithm development. This is done over the same path used to load and verify the lookup table RAM, thereby saving hardware. Furthermore, by allowing the image collection logic similar access to the feedback, flag and data bits of the lookup tables, extensive testing and diagnostic capabilities are easily accommodated.

The flag bit and the corrected data bit are sent to the subsequent PE. The corrected data bit will be the same as the center pixel P9 except when the thinning operation deletes it, in which case when P9 is a 1, it becomes a 0 in the corrected data. The flag bit is set to conditionally delete pixel P9 as has been discussed above. The removal of conductor pixels where appropriate by a PE causes the original image to become thinned as it progresses from one processing element to the next. A PE can remove one pixel from either side of a conductor line, thus, the maximum amount of thinning that can be performed by the processing elements is 2 times the number N of processing elements. Any line which is thicker than 2N+1 will not be completely skeletonized. It may be desirable to set the decimator such that all of the conductor lines come within 2N+1 thickness. Alternatively, the number of processing elements can be increased to accommodate thicker lines.

The lookup table 46 is advantageously programmable such that variations on the thinning algorithm can be employed by the various processing elements in the series. In accordance with a first simple thinning algorithm, each PE performs this operation by removing at most one pixel from around the border of a conductor. Traces are lines which are skeletonized but not eradicated. The end points of a skeletonized trace remain fixed, in other words, the end points are preserved. In accordance with a second thinning algorithm, trimming can be added to the thinning operation such that the end points of a skeletonized trace are cut back by one pixel.

For example, a one pixel wide ten pixel long entity will end up as a 1×8 after one pass through this second thinning algorithm. Thus, the second thinning algorithm is more aggressive than the first, yet it still will not cause the complete eradication of a feature. The second algorithm may be useful in inhibiting the growth of spurs which occur as a result of the thinning algorithm at the corners of square pads during normal thinning operations. The spurs are not completely repeatable from one circuit board to the next since they are dependent on the imaging. A slight one pixel variation can mean the difference between a spur and no spur.

In a third variation of the thinning algorithm, thinning is biased against horizontal and vertical traces. The result is that this thinning algorithm continues to remove pixels from diagonal lines, round pads start to become diamond shaped. If this third algorithm is mixed in with either of the prior algorithms by providing one for every two or three PE's programmed with the other algorithms then the end result is that after all thinning stages, round pads still look round and diagonal lines thin at about the same rate as horizontal or vertical lines. This feature may be important in cases where the number of stages of regular thinning required to skeletonize diagonal lines cause the skeletonization of some small blob entities. It would also be possible to program a PE to perform just the trimming function to remove end points from skeletal traces without performing the thinning routine. The particular thinning algorithm employed in any PE can be programmed so that the thinning operation performed over the entire series of PE's achieves the desired result.

After thinning is completed, the skeletonized image is analyzed by the join detection processing elements and the feature lookup table for producing a report indicating where the various circuit features lie in the image. The first PE used in join detection, we call the blob detection PE 16. The blob detection PE generates two output bits which are used. One bit from the blob detection element 16 goes to a join detection element 18. The other bit goes to a blob counter element 20. The blob detection PE 16, the join detection PE 18 and the blob counter PE 20 are built in the same manner as the thinning PE's 14. They are simply programmed differently to provide different outputs.

The blob detection PE 16 passes the center pixel from its 3×3 pixel window unchanged to the join detection processing element 18 unless the pixel is definitely considered redundant. In accordance with the presently preferred embodiment, there are only two cases in which the output bit to the join detection PE 18 differs from the center pixel. These two are illustrated in FIGS. 6A and 6B. For these windows, the bit is changed from a one to a zero. In all other cases, the center pixel is passed through unchanged.

The other bit output from the blob detection processing element 16 into the blob counter 20 provides a 1 if the center pixel is a part of a blob in the 3×3 window. If the center pixel is not a part of a blob, the output is a 0. A blob is defined as a 2×2 window in which all of the pixels are 1's. Thus, a blob is made up of at least four 1's in a 2×2 array.

The output of the join detection PE 18 is four bits. This permits the join detection PE 18 to characterize the 3×3 window as one of up to sixteen patterns. Eight patterns are selected from in the presently preferred embodiment. If the center pixel is a 0, the output will indicate that it is on insulator. If the center pixel is a 1 and all of the neighboring pixels are 0, the processing element will indicate a zero join. A zero join may be the result of metal flecks or dust. Other patterns include a 1-join which has a 1 in the center and a 1 in a neighboring pixel or possibly two adjacent 1's in the neighboring pixels with the remainder of the neighbors being 0. In a 2-join, there are two 1's or pairs of 1's in the neighboring pixels separated from one another by insulator. In a 3-join, there are three 1's or pairs of 1's each separated by 0's in the neighboring pixels. An indication can be made if the center pixel is a redundant pixel. The pixel is redundant if the other pixels in the window will provide sufficient feature information. Another pattern is when the center pixel is on the boundary of a blob. A final pattern that can be identified is when the center pixel is internal to a blob. This is indicated when at least seven of the eight neighboring pixels are all 1's.

The patterns reported by the join detection PE 18 are determined by referring to the lookup table in the PE. The lookup table can be programmed to produce the desired report of pattern features as desired in the particular processing system implementation. The feedback bit of the processing element can also be used to help clarify some of the patterns. In accordance with the presently preferred embodiment, a 4-join is indicated by signalling a 3-join and setting the feedback bit. The feedback bit will cause the pattern for the next look up to include one additional join. In other words, after a 4-join, the feedback bit is set so that a subsequent 2-join is indicated as a 3-join instead.

The blob counter 20 looks at its 3×3 window and gives an output of four bits which indicates the number of blobs in the 3×3 window. If any single pixel in the 3×3 window is a 1, then one blob will be indicated. Two pixels that are 1's which are adjacent to one another in a horizontal or vertical direction would also be indicated as a single blob. Two 1's at an angle would indicate two blobs. The maximum number of blobs that can be found in the 3×3 window would be four when the 1's appear in the four corners of the 3×3 window. Since it is possible to have a blob to blob join which has no skeletal elements, precautions must be taken to make sure these blob-blob joins are reported only once. These joins are detected when the join detection processing element 18 indicates an on boundary condition and the blob counter 20 indicates two distinct blobs. To prevent these from being reported twice, only those cases in which the 2×2 block is in the lower part of the 3×3 window will report the two blobs, when the 2×2 block is in the upper part of the window the look up table of the blob counter is set to indicate only one blob. The feature lookup table 22 receives the four bits from the join detection processing element 18 and four bits from the blob counter 20. These inputs are used to address the lookup table and produce a four bit output. For many pixels the output will be "no report" since they are not at the center of a distinctive feature. For instance, pixels along a line acting as a skeletal trace will produce no report. However, at the end of the trace the last pixel will generate a report of a 1-join. While the reporting that is required by any particular implementation may change, it is a simple matter to alter the table in the lookup table 22 to achieve the desired reporting. Referring to FIG. 7A-N, the reports of the presently preferred embodiment are shown along with an example of the image and the feature inputs which would generate such a report.

The present invention advantageously uses the same PE hardware for thinning and feature detection. Thinning can be accomplished in a single pass with 3×3 windows using the flag and feedback bits of the present invention. The PE's are advantageously programmable to permit the user to adapt the system to particular reporting needs.

Of course, it should be understood that various changes and modifications to the preferred embodiment described above will be apparent to those skilled in the art. For example, various algorithms may be implemented using the present invention by simply reprogramming the lookup tables in the PEs. Also, the direction in which the window is moved along an image can be changed to across or downwards without changing the basic mechanism of the invention. These and other changes can be made without departing from the spirit and scope of the invention and without diminishing its attendant advantages. It is therefore intended that such changes and modifications be covered by the following claims.

I claim:

1. An image processing element comprising:
    means for receiving, in each of a series of time periods, a data bit and a flag bit, said data bit coming from a stream of data bits representative of a 2-dimensional image;
    logic means for generating a corrected data bit in response to at least said data bit and said flag bit;
    n parallel arrays of registers, where n is an integer;
    a plurality of line buffers connected with said n parallel arrays of registers such that said n parallel arrays hold a window of corrected data bits; and
    a lookup table for generating at least a data bit and a flag bit in response to at least said window of data bits.

2. The image processing element of claim 1 wherein said lookup table may be programmed with a set of window templates for generating the data bit and the flag bit in response to a match between a template and said window of data bits.

3. The image processing element of claim 1 wherein aid logic means is further responsive to selected bits from said n arrays of registers.

4. The image processing element of claim 3 wherein said flag bit received by said receiving means has a state which causes said logic means to delete said data bit depending on said selected bits.

5. The image processing element of claim 1 wherein said lookup table further generates a new feedback bit and said lookup table is further responsive to an old feedback bit generated by said lookup table in the previous time period.

6. The image processing element of claim 5 wherein said feedback bit indicates whether said lookup table has performed a thinning operation.

7. An image processing element comprising:
    means for receiving over a series of consecutive time periods a stream of data bits representative of a 2-dimensional image, each data bit being received in one of said time periods;
    means for receiving flag bits from an adjacent image processing element;
    logic means for generating a corrected data bit in response at least to a data bit from said data bit receiving means and a flag bit from said flag bit receiving means;
    n parallel arrays of registers, where n is an integer;
    a plurality of line buffers connected with said n parallel arrays of registers such that said n parallel arrays hold a window of corrected data bits; and
    a lookup table for generating a data bit, a flag bit and a new feedback bit in response to said window of corrected data bits and an old feedback bit generated by said lookup table in the previous time period.

8. The image processing element of claim 7 wherein said flag bit generated by said lookup table has a state which conditionally deletes the data bit generated by said lookup table.

9. The image processing element of claim 7 wherein said old feedback bit indicates whether a thinning operation occurred in the previous time period.

10. The image processing element of claim 7 wherein said lookup table may be programmed with a set of window templates for generating the data bit the flag bit and the new feedback bit in response to a match between a template and said window of corrected data bits.

* * * * *